US009990950B1

United States Patent
Mader et al.

(10) Patent No.: US 9,990,950 B1
(45) Date of Patent: Jun. 5, 2018

(54) CALIBRATION AND ADJUSTING TARGET PRE-WRITE CLEARANCE OFFSET FOR A HEAT-ASSISTED MAGNETIC RECORDING DEVICE

(71) Applicant: Seagate Technology LLC, Cupertino, CA (US)

(72) Inventors: Drew Michael Mader, Minneapolis, MN (US); Steven J. Kimble, Chanhassen, MN (US); Jason W. Riddering, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/651,299

(22) Filed: Jul. 17, 2017

(51) Int. Cl.
| | |
|---|---|
| *G11B 11/00* | (2006.01) |
| *G11B 5/60* | (2006.01) |
| *G11B 20/10* | (2006.01) |
| *G11B 5/00* | (2006.01) |
| *G11B 7/126* | (2012.01) |
| *G11B 7/1263* | (2012.01) |
| *G11B 7/1267* | (2012.01) |

(52) U.S. Cl.
CPC ...... *G11B 5/6029* (2013.01); *G11B 20/10388* (2013.01); *G11B 5/607* (2013.01); *G11B 5/6076* (2013.01); *G11B 5/6088* (2013.01); *G11B 7/126* (2013.01); *G11B 7/1263* (2013.01); *G11B 7/1267* (2013.01); *G11B 2005/0021* (2013.01)

(58) Field of Classification Search
USPC .... 369/13.01–13.55, 112.09, 112.14, 112.21, 369/112.27, 300; 360/59, 75, 360/123.02–125.75, 131
See application file for complete search history.

(56) References Cited

U.S. PATENT DOCUMENTS

| | | | |
|---|---|---|---|
| 6,396,783 B1 | 5/2002 | Bell et al. | |
| 6,437,930 B1 * | 8/2002 | Liu ..................... | G11B 5/6005 360/75 |
| 7,492,543 B2 | 2/2009 | Mitsunaga et al. | |
| 7,616,398 B2 | 11/2009 | Gong | |
| 7,990,647 B2 | 8/2011 | Lille | |
| 8,416,650 B2 | 4/2013 | Mori et al. | |
| 8,638,349 B1 | 1/2014 | Liu et al. | |

(Continued)

*Primary Examiner* — Tan X Dinh
(74) *Attorney, Agent, or Firm* — Hollingsworth Davis, LLC

(57) ABSTRACT

An apparatus comprises a slider configured for heat-assisted magnetic coupled to a controller. The slider comprises a writer, a heater, a near-field transducer, and an optical waveguide for communicating light from a laser diode to the near-field transducer. The controller is configured to set a target pre-write clearance of the slider prior to performing a write operation, set a target write clearance of the slider for performing the write operation, and determine a difference between the target pre-write and write clearances to define a target pre-write clearance offset. The controller is also configured to measure, for a plurality of different target pre-write clearance offsets, a writability metric for the slider while sweeping a laser diode current, and adjust the target pre-write clearance offset so that the writability metric reaches a predetermined threshold. The controller is further configured to perform subsequent write operations using the adjusted target pre-write clearance offset.

20 Claims, 9 Drawing Sheets

(56) References Cited

U.S. PATENT DOCUMENTS

| | | |
|---|---|---|
| 8,654,618 B1 | 2/2014 | Liu et al. |
| 8,743,667 B1 | 6/2014 | Brockie et al. |
| 8,760,779 B2 | 6/2014 | Johns et al. |
| 8,787,125 B1 | 7/2014 | Lee |
| 8,804,272 B1 | 8/2014 | Dakroub et al. |
| 8,804,273 B1 | 8/2014 | Camalig et al. |
| 8,837,070 B1 | 9/2014 | Johnson et al. |
| 8,837,071 B2 | 9/2014 | Macken et al. |
| 8,867,323 B2 | 10/2014 | Andruet et al. |
| 8,873,350 B2 | 10/2014 | Rausch et al. |
| 8,873,353 B1 * | 10/2014 | Riddering .............. G11B 5/314 369/13.33 |
| 8,902,718 B1 | 12/2014 | Ruan et al. |
| 8,922,929 B1 | 12/2014 | Ruan et al. |
| 8,937,853 B2 | 1/2015 | Zheng et al. |
| 9,019,646 B2 | 4/2015 | Rausch et al. |
| 9,030,773 B2 | 5/2015 | Macken et al. |
| 9,236,081 B1 * | 1/2016 | Chu .................. G11B 11/10595 369/13.33 |
| 9,472,225 B2 | 10/2016 | Lou et al. |
| 9,607,649 B1 * | 3/2017 | Riddering .............. G11B 5/607 369/13.33 |
| 2006/0139789 A1 | 6/2006 | Yang |
| 2008/0072692 A1 | 3/2008 | Uji et al. |
| 2008/0170321 A1 | 7/2008 | Shimozato |
| 2009/0268330 A1 | 10/2009 | Lee et al. |
| 2013/0091695 A1 | 4/2013 | Shimazawa et al. |
| 2013/0286802 A1 | 10/2013 | Kiely |
| 2013/0286805 A1 | 10/2013 | Macken et al. |
| 2013/0286807 A1 | 10/2013 | Gao et al. |
| 2014/0009851 A1 | 1/2014 | Budde |
| 2014/0023108 A1 | 1/2014 | Johnson et al. |
| 2014/0029396 A1 | 1/2014 | Rausch et al. |
| 2014/0269238 A1 | 9/2014 | Kautzky et al. |
| 2014/0269819 A1 | 9/2014 | Kiely et al. |
| 2014/0334275 A1 | 11/2014 | Zheng et al. |
| 2015/0003219 A1 | 1/2015 | Isokawa et al. |
| 2015/0003223 A1 | 1/2015 | Macken et al. |
| 2015/0109892 A1 | 4/2015 | Contreras et al. |
| 2016/0232930 A1 * | 8/2016 | Lou ........................ G11B 5/607 369/13.33 |

\* cited by examiner

CALIBRATION AND ADJUSTING TARGET PRE-WRITE CLEARANCE OFFSET FOR A HEAT-ASSISTED MAGNETIC RECORDING DEVICE

SUMMARY

Embodiments are directed to a method comprising moving a slider configured for heat-assisted magnetic recording relative to a magnetic recording medium, setting the slider to a target pre-write clearance prior to performing a write operation, and setting a target write clearance of the slider for performing the write operation. The method comprises determining a difference between the target pre-write and write clearances to define a target pre-write clearance offset. The method comprises measuring, while sweeping a laser diode current for each of a plurality of different target pre-write clearance offsets, a writability metric for the slider. The method also comprises adjusting the target pre-write clearance offset so that the writability metric reaches a predetermined threshold. The method further comprises performing subsequent write operations using the adjusted target pre-write clearance offset.

Embodiments are directed to an apparatus comprising a slider movable relative to a magnetic recording medium. The slider comprises a writer, a heater, a near-field transducer, and an optical waveguide for communicating light from a laser diode to the near-field transducer. A controller is coupled to the slider and configured to set a target pre-write clearance of the slider prior to performing a write operation, set a target write clearance of the slider for performing the write operation, and determine a difference between the target pre-write and write clearances to define a target pre-write clearance offset. The controller is also configured to measure, for a plurality of different target pre-write clearance offsets, a writability metric for the slider while sweeping a laser diode current, and adjust the target pre-write clearance offset so that the writability metric reaches a predetermined threshold. The controller is further configured to perform subsequent write operations using the adjusted target pre-write clearance offset.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to detection and control of head-media spacing in data storage devices. The detection of head-to-media spacing becomes more challenging in what are referred to as heat-assisted magnetic recording or HAMR devices. This technology, also referred to as energy-assisted magnetic recording (EAMR), thermally-assisted magnetic recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to superparamagnetic effects that can lead to data errors.

Generally, HAMR recording heads may utilize heaters for fine control of head-to media spacing. The heaters heat a portion of the recording head that faces the recording medium. The heating causes a local protrusion due to thermal expansion of the material. Thermal protrusion can be finely controlled to maintain a desired clearance between read/write transducers and the recording medium. In HAMR, a number of other components near the read and write transducers may contribute to thermal protrusion. This can make the estimation and control of head-to-media spacing more difficult in a HAMR recording head.

Figure 1:
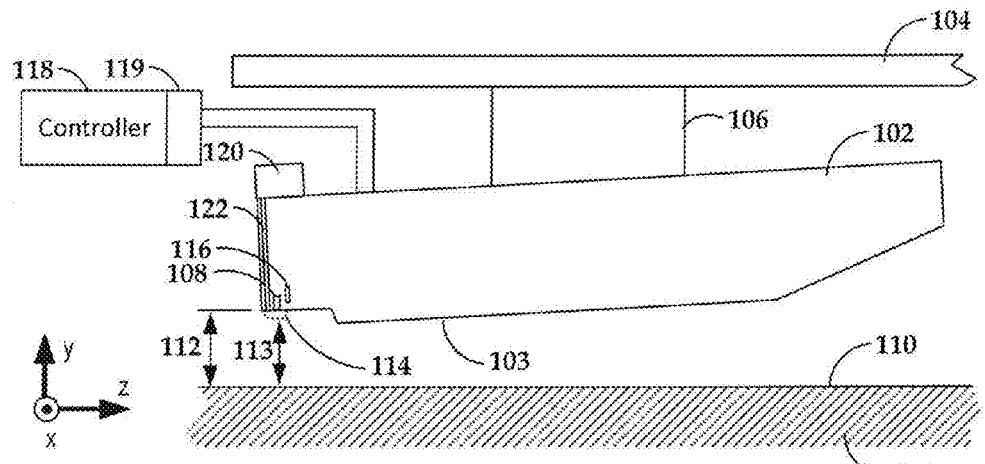
FIG. 1 is a block diagram of a heat-assisted magnetic recording (HAMR) head and media arrangement according to a representative embodiment.

In reference now to FIG. 1, a block diagram shows a side view of a slider 102 according to a representative embodiment. The slider 102 may also be referred to as a recording head, read head, read/write head, head, etc. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. When the slider 102 is located over surface 110 of recording medium 111, a flying height 112 is maintained between the slider 102 and the surface 110 by a downward force of arm 104. This downward force is counterbalanced by an air cushion that exists between the surface 110 and an air bearing surface (ABS) 103 (also referred to as a "media-facing surface") of the slider 102 when the recording medium 111 is rotating.

It is desirable to maintain a predetermined slider flying height 112 over a range of drive operating conditions (e.g., different rotational speeds, temperatures, humidities, etc.) during both reading and writing operations to ensure consistent performance. Region 114 is a "close point" of the slider 102, which is generally understood to be the closest point of contact between the read/write transducers 108 and the magnetic recording medium 111, and generally defines the head-to-media spacing 113. To account for both static and dynamic variations that may affect slider flying height 112, the slider 102 may be configured such that a region 114 of the slider 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114.

To provide this type of control over dynamic/effective head-to-media spacing 113 via heat, the slider 102 may include (or otherwise be thermally coupled to) one or more heating elements 116. These heating elements 116 (e.g., resistance heaters) may be provided with selectable amounts of current by a controller 118. Generally, the controller 118 at least includes logic circuitry for controlling the functions of an apparatus that includes at least the slider 102 and recording medium 111, and may include other components not shown, such as spindle motor, arm actuator, power supplies, etc. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the slider 102 and other components not shown.

Other elements of the slider 102 may also produce heat besides or in addition to the heating element 116. For example, a write coil of the read/write transducers 108 may generate sufficient heat to cause configurable deformation of region 114. This deformation will only occur when the coil is energized, e.g., when data is being written. Further, additional components within or near the HAMR head may generate heat near the read/write transducer 108. These heat-generating components include laser 120 (or other energy source), waveguide 122, and a near-field transducer (NFT) (not shown). The waveguide 122 delivers light from the laser 120 to components (e.g., NFT) near the read/write transducers 108. These components are shown in greater detail in FIG. 2.

Figure 2:
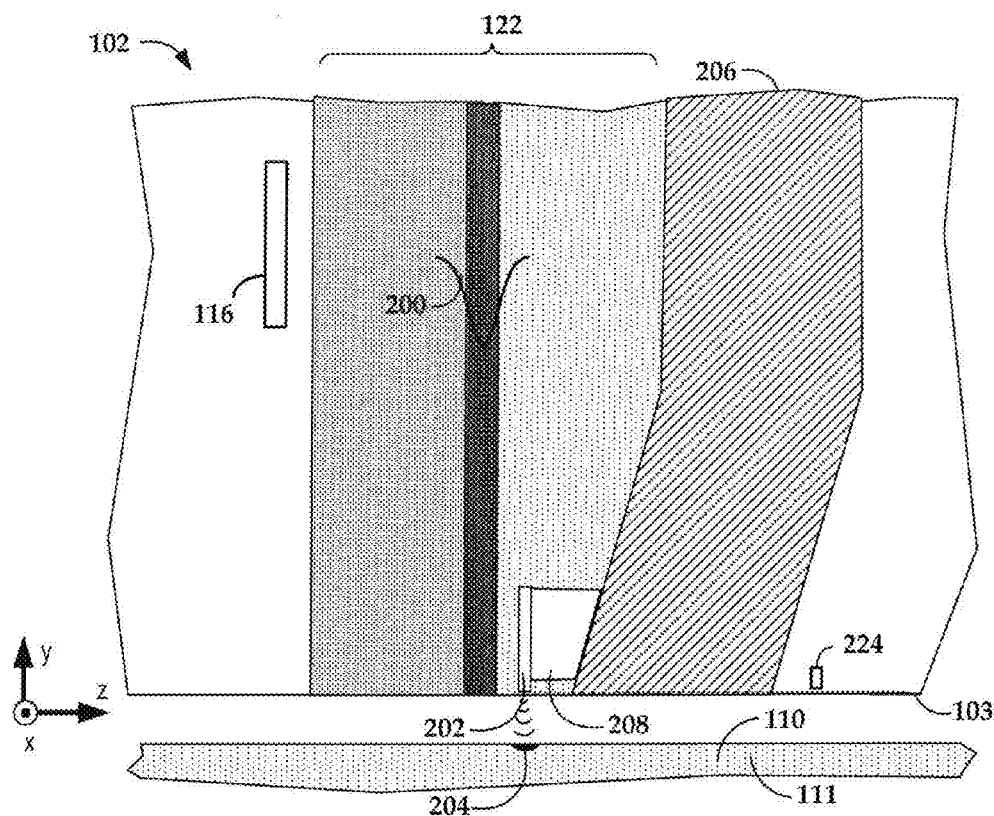
FIG. 2 is a cross-sectional view of a HAMR head according to a representative embodiment.

In FIG. 2, a block diagram illustrates a cross-sectional view of the slider 102 according to a representative embodiment. The waveguide 122 receives electromagnetic energy 200 from the energy source, the energy being coupled to the NFT 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The slider 102 additionally includes the heating element (heater) 116 that may be used to adjust the protrusion of the write pole 206/NFT 202, a read transducer (not shown) and a sensor 224. A writer heater may be situated proximate a writer of the slider 102, and a reader heater may be situated proximate a reader of the slider 102. The sensor 224 may be used for various purposes, such as head-medium spacing measurements and contact detection. The sensor 224 may be a temperature coefficient of resistance (TCR) type sensor, for example, a dual-ended TCR (DETCR). The slider 102 further includes a heat sink 208 that is thermally coupled to the NFT 202. The heat sink 208 may be used to draw heat away, e.g., to the write pole 206 or other nearby heat-conductive components, as the heat at the hotspot 204 increases.

Figure 3:
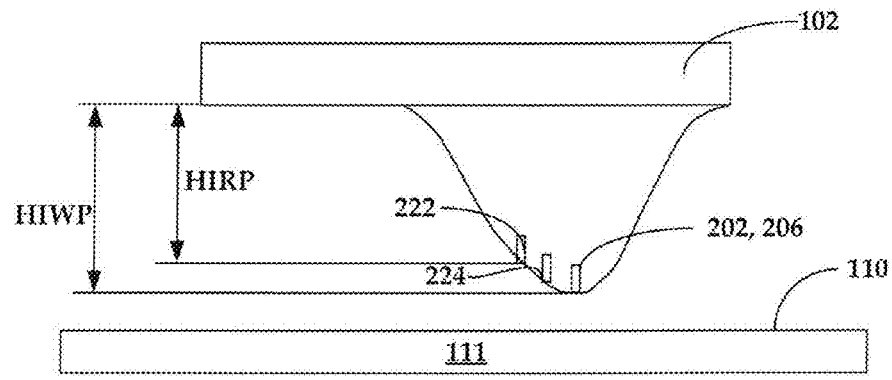
FIG. 3 is a block diagram illustrating protrusion of a HAMR head according to a representative embodiment.
Figure 4:
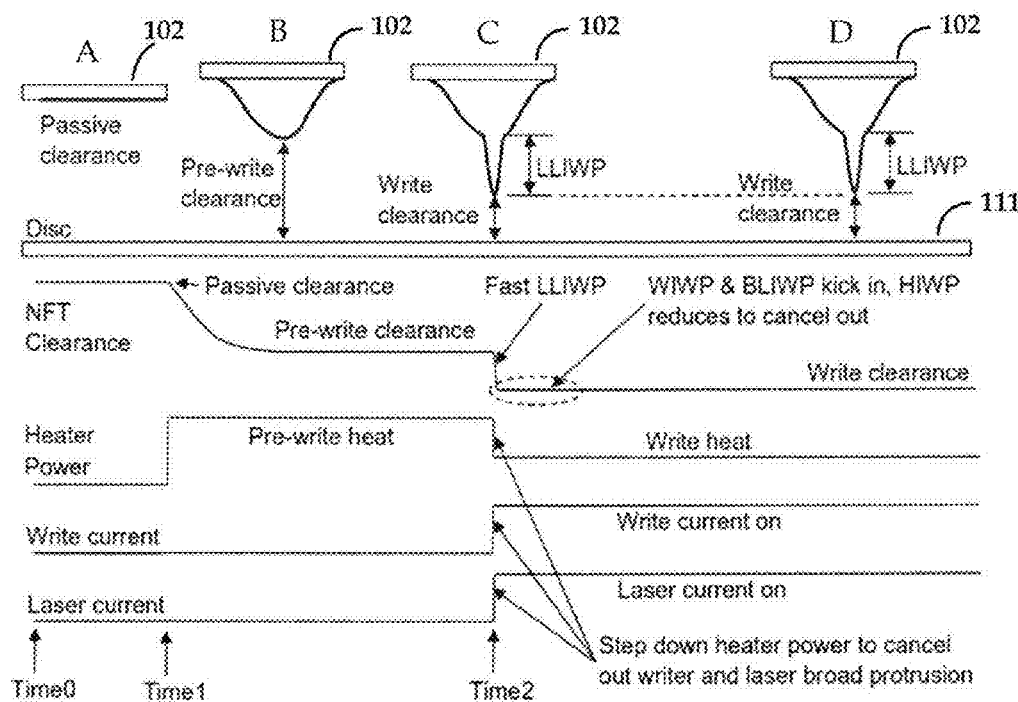
FIG. 4 is a block diagram illustrating passive, pre-write, and write clearance between a magnetic recording medium and a HAMR head according to a representative embodiment.

As shown in FIG. 3, as the temperature within the slider 102 increases the area of the slider 102 containing, for example, the NFT 202 and write pole 206, reader 222 and the sensor 224, protrudes towards the surface 110 of the medium 111. FIG. 4 illustrates the variations in protrusion and in clearance of the slider 102 from the medium 111 as the slider 102 is prepared for and executes a writing operation. The slider 102 will be protruded by the heater (HIWP—heater induced writer protrusion), the writer (WIWP—writer induced writer protrusion) and the laser (LIWP—laser induced writer protrusion). The combined protrusion of HIWP+WIWP+LIWP will place the NFT 202 of the slider 102 at the target write clearance. To set write clearance, a write zero clearance reference may be established through contact detection using "write plus heat" with or without the laser. During "write plus heat" contact detection, the write current will be established through a set of default write parameters which may, for example, include write steady-state current, overshoot amplitude, overshoot duration, frequency, and rise time. Further, the laser current may be off or at some predetermined value. Contact detection may be performed using any appropriate method. The "write plus heat" contact detection establishes a zero clearance reference and also establishes the heater power required to achieve contact ("contact power"). This zero clearance reference may be used to establish the target write clearance.

It should be noted that in HAMR, laser induced writer protrusion (LIWP) can be decomposed into two components: (1) local laser induced writer protrusion (LLIWP) and broad laser induced writer protrusion (BLIWP). The LLIWP is narrow in shape and has a very short time constant while the BLIWP is broad in shape and has a long time constant, similar to the heater and writer current induced protrusions. LLIWP (and BLIWP) can be very head-dependent, and can vary as a function of the shape of the NFT 202 (e.g., if the NFT degrades, the LIWP value can also change).

The target pre-write clearance can be defined as the target write clearance minus LLIWP. The target pre-write clearance is initially set at a relatively high clearance and iteratively reduced in accordance with a calibration technique described hereinbelow. The difference between the target pre-write clearance and the target write clearance is referred to herein as the Default Pre-write Clearance Offset (DPCO). Embodiments of the disclosure are directed to calibrating the pre-write clearance offset on a head-by-head basis, rather than using a default global value that is traditionally used. Calibrating the target pre-write clearance offset in accordance with the present disclosure compensates for LLIWP which is unique to each HAMR head of a HAMR device.

If the target pre-write and write clearances have been established, a HAMR slider will operate under the clearance progression illustrated in FIG. 4. As shown, the clearance between slider 102 and medium 111 transitions from the slider 102 at a passive clearance stage A (before pre-write heat is applied), to a target pre-write clearance stage B (pre-write heat has been applied), to a target write clearance stage C (when heater, writer and laser heat is applied), and the target write clearance stage D (steady-state write is occurring). As the slider 102 transitions through the clearance progression, it operates in accordance with the timing diagram of FIG. 4.

At time 0, the heater is off and the slider 102 is flying at the passive clearance. At time 1, at three times the heater constant to five times the heater time constant ahead of writing, the heater is turned on to a pre-write heat power level. At this point, the slider will protrude down to the target pre-write clearance adequately before the write starts. At time 2, the write operation starts with the write current and the laser is turned on. Within 1 to 2 μsec, the laser induced LLIWP will cause the NFT to protrude from the target pre-write clearance down to the target write clearance. At time 2, the write current and the laser will also start the slider to protrude with WIWP and BLIWP at a long time constant, e.g., ~100 μsec. The heater power then steps from pre-write heat down to write heat to compensate for WIWP and BLIWP to maintain the target write clearance throughout the write process.

It has been observed from HAMR drive data that the first few sectors of a write operation can be substantially poorer than later sectors of the write operation, particularly when the NFT has degraded. For example, the first sector or first few sectors (e.g., the first 5-20 sectors) and the last sector of data written to a track of a recording medium can have very different writability metrics (e.g., bit error rate or BER). The writability metric of the first sector or first few sectors can vary significantly from the track average writability metric. HAMR drive data shows that the slider may be flying too high on some heads of a HAMR drive during the first few sectors of a write operation. The impact of this excessive fly height during the first few sectors—poor writability metrics—can be reduced or eliminated by adjusting the target pre-write clearance offset on a head-by-head basis in accordance with embodiments of the disclosure, particularly when laser current during a write operation is sub-optimal.

As was discussed previously, the dynamics of a write operation in a HAMR drive are more complicated when compared to a traditional perpendicular magnetic recording (PMR) drive, specifically due to the nature of the laser source and the NFT which are key components used to write magnetic bits to the recording medium of the HAMR drive. In HAMR, the protrusion (LIWP) of the slider body, caused by the heat generated from the laser (among other components), and the protrusion of the NFT, caused by the energy being transferred to the NFT, can vary in magnitude and in time and, therefore, vary the performance and reliability of a HAMR head.

In HAMR, a constant fly height of the recording head is desired in order to provide consistent performance and reliability. If the slider flies too low, better performance is achieved but reliability is reduced due to repeated contact with the recording medium. If the slider flies too high, reliability is improved but performance is reduced. As was previously discussed, to maintain a constant fly height, a heater of the slider is controlled to increase or decrease the heat at the ABS caused by the various heat sources (e.g., magnetic writer, ambient temperature, laser, etc.) of the slider. The target pre-write clearance is controlled by the heater. The target pre-write clearance is a strong function of LIWP and has significant impact on the performance of the first few sectors of a write operation. Due to differences between different recording heads (e.g., slider, NFT, and LIWP differences), the first few sectors of a write operation can vary substantially from head to head particularly when the NFT is degraded. It has been observed that LIWP of a HAMR head can vary over time as the NFT degrades.

Figure 5:
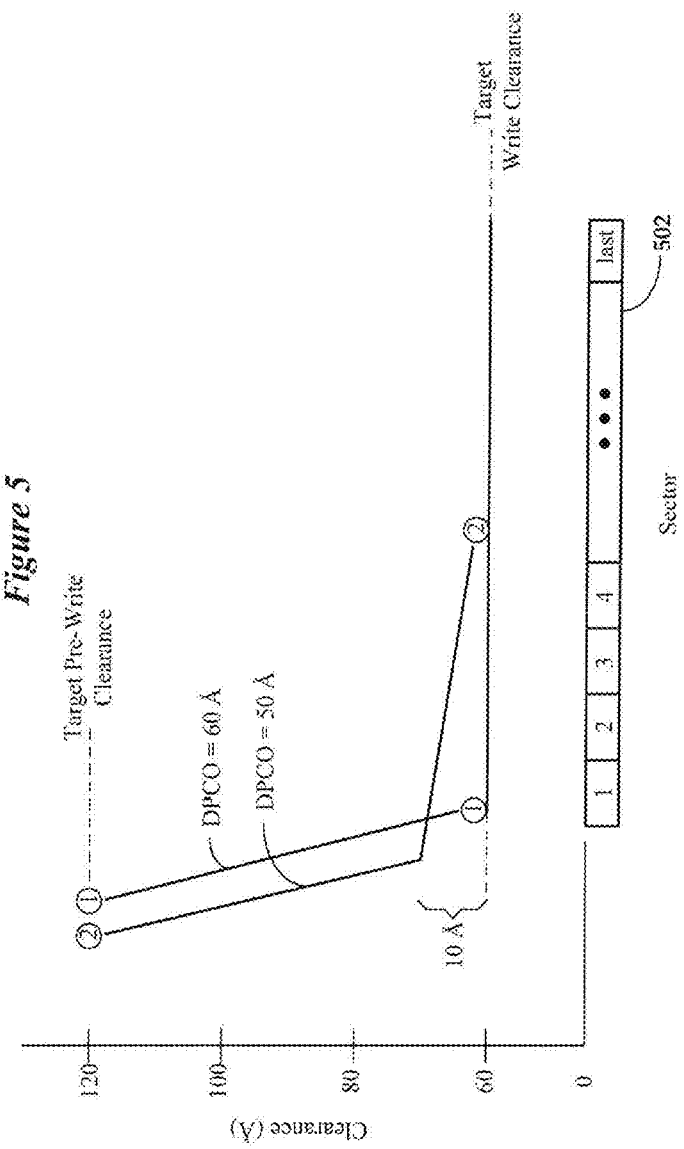
FIG. 5 shows the effect of target pre-write clearance offset on writing the first few sectors of a track of a magnetic recording medium for different representative sliders in accordance with various embodiments.
Figure 6:
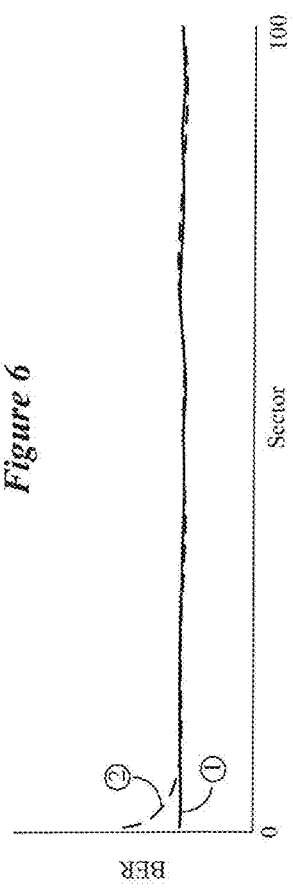
FIG. 6 shows a writability metric, bit error rate (BER), for write operations performed by the sliders shown in FIG. 5.

FIG. 5 shows the effect of target pre-write clearance offset on writing the first few sectors of a track of a magnetic recording medium for different representative sliders in accordance with various embodiments. FIG. 6 shows a writability metric, BER, for write operations performed by the sliders shown in FIG. 5. In this representative example, Sliders 1 and 2 are controlled by a controller (and a writer heater) to begin a write operation at sector 1 of a track 502 of the magnetic storage medium. For simplicity, Sliders 1 and 2 have the same target pre-write clearance in this representative example. It is understood that the values of DPCO, target pre-write clearance, and target write clearance can be different from those shown in FIG. 5 according to various embodiments. For example, the values of DPCO, target pre-write clearance, and target write clearance can be between 30 and 70% (e.g., 50%) of those shown in FIG. 5 in some embodiments. In other embodiments, the values of DPCO, target pre-write clearance, and target write clearance can be greater than or less than those shown in FIG. 5. It is understood that Sliders 1 and 2 can have different target pre-write clearances, particularly after calibration.

In FIG. 5, Slider 1 has a DPCO that is set correctly because at this DPCO, Slider 1 achieves a target write clearance at the desired time. In this representative example, Slider 1 has a DPCO of 60 Å. With a target pre-write clearance of 120 Å and a DPCO of 60 Å, Slider 1 achieves a target write clearance of 60 Å at the desire time for writing to sector 1 and subsequent first few sectors of the track 502. In this case, the DPCO of 60 Å for slider 1 provides an acceptable or optimal writability metric for the first few and subsequent sectors of the track 502, as indicated by the BER plot for Slider 1 in FIG. 6.

Slider 2 has a DPCO that is set incorrectly because at this DPCO, Slider 2 does not achieve the target write clearance at the desired time. With a target pre-write clearance of 120 Å and a DPCO of 50 Å, Slider 2 achieves a target write clearance of 70 Å over sector 1, which is too high relative to the track 502 to provide an acceptable or optimal writability metric for sector 1 and the first few sectors of track 502. FIG. 6 shows an unacceptable or sub-optimal writability metric for Slider 2 for the first few sectors of the track 502. The controller can compensate for the poor write performance of Slider 2 during the first few sectors by increasing power to the writer heater, thereby causing Slider 2 to reduce its flying height by another 10 Å. After compensation, an acceptable or optimal writability metric is achieved for the first few sectors of the write operation. According to various embodiments, a target pre-write clearance offset calibration procedure can be performed for Slider 2 in order to calculate a new target pre-write clearance offset (DPCO) that will produce an acceptable or optimal writability metric beginning with the first sector of a write operation (e.g., as in the case of Slider 1).

Embodiments are directed to calibrating the target pre-write clearance offset of a HAMR head (target pre-write clearance–target write clearance). This calibration can be performed on a head-by-head basis (e.g., for each individual head of a HAMR drive). According to various embodiments, the target pre-write clearance offset of a HAMR head is calibrated as a function of laser diode current ($I_{OP}$), which can be swept between a minimum value and a maximum value. In some embodiments, the laser diode current, $I_{OP}$, can be swept between sub-optimal write current values. In other embodiments, the laser diode current, $I_{OP}$, can be swept between sub-optimal and optimal write current values.

As was previously discussed, it has been observed that as the NFT degrades over time, the writability performance for the first few sectors of a write operation can become poorer relative to latter written sectors. Calibrating the target pre-write clearance as a function of laser diode current including sub-optimal laser currents, which is a proxy for a degraded NFT, can be helpful. As was also discussed previously, calibrating the target pre-write clearance can be helpful for a HAMR head that is flying excessively high over the first few sectors during a write operation.

Figure 7:
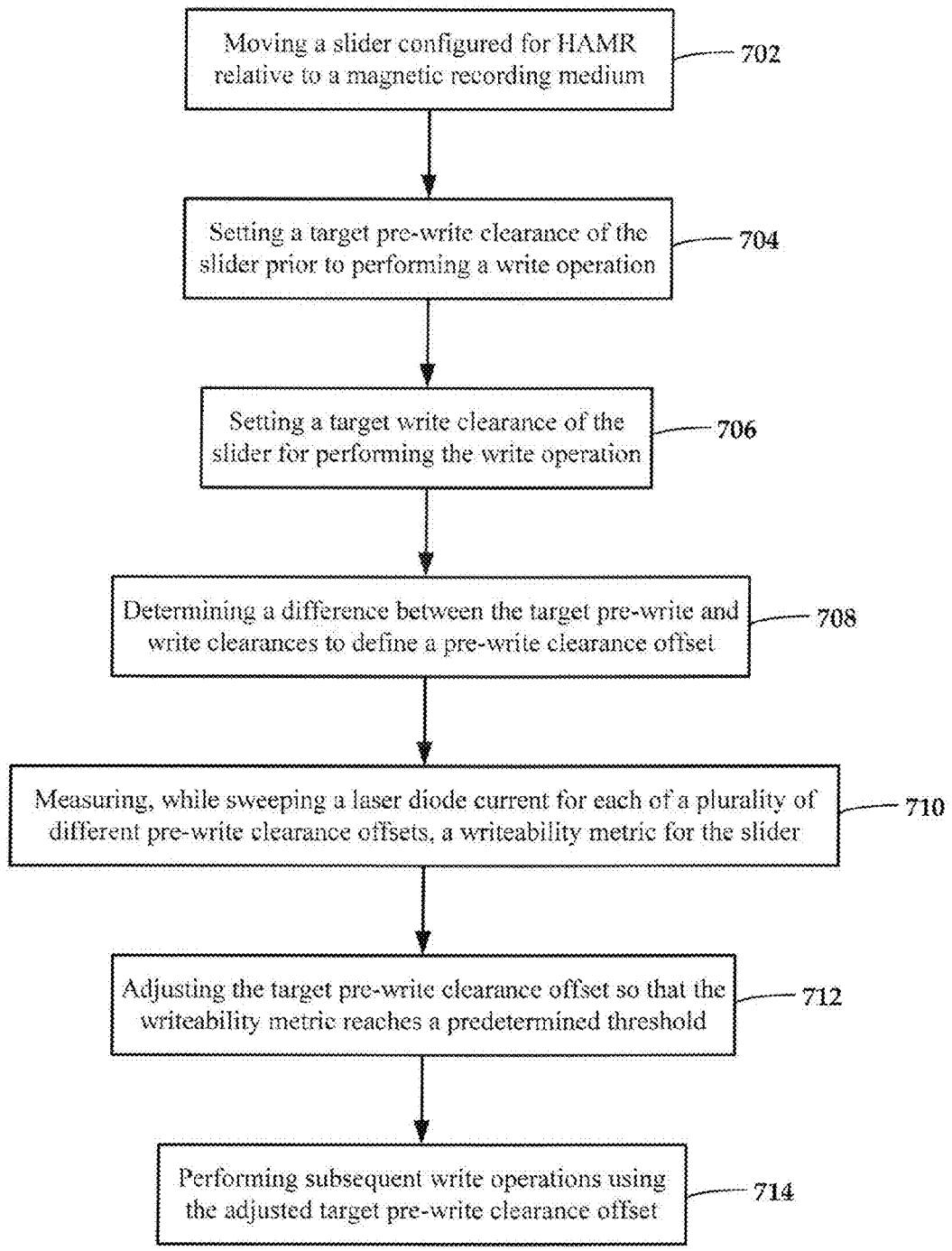
FIG. 7 illustrates a method for calibrating the target pre-write clearance offset of a HAMR head in accordance with various embodiments.

FIG. 7 illustrates a method for calibrating the target pre-write clearance offset of a HAMR slider in accordance with various embodiments. The method shown in FIG. 7 can be performed on a head-by-head basis, such that the pre-write clearance offset for each head is individually calibrated. The method shown in FIG. 7 involves moving 702 a slider configured for HAMR relative to a magnetic recording medium. The method involves setting 704 a target pre-write clearance of the slider prior to performing a write operation. The method also involves setting 706 a target write clearance of the slider for performing the write operation. The method involves determining 708 a difference between the target pre-write and write clearances to define a pre-write clearance offset (DPCO). The method further involves measuring 710 a writability metric for each of a multiplicity of different pre-write clearance offsets for the slider. For example, a writability metric for the slider can be measured while sweeping a laser diode current ($I_{OP}$) for each of a multiplicity of different pre-write clearance offsets. The method involves adjusting 712 the target pre-write clearance offset so that the writability metric reaches a predetermined threshold. The method also involves performing 714 subsequent write operations using the adjusted target pre-write clearance offset.

Figure 8:
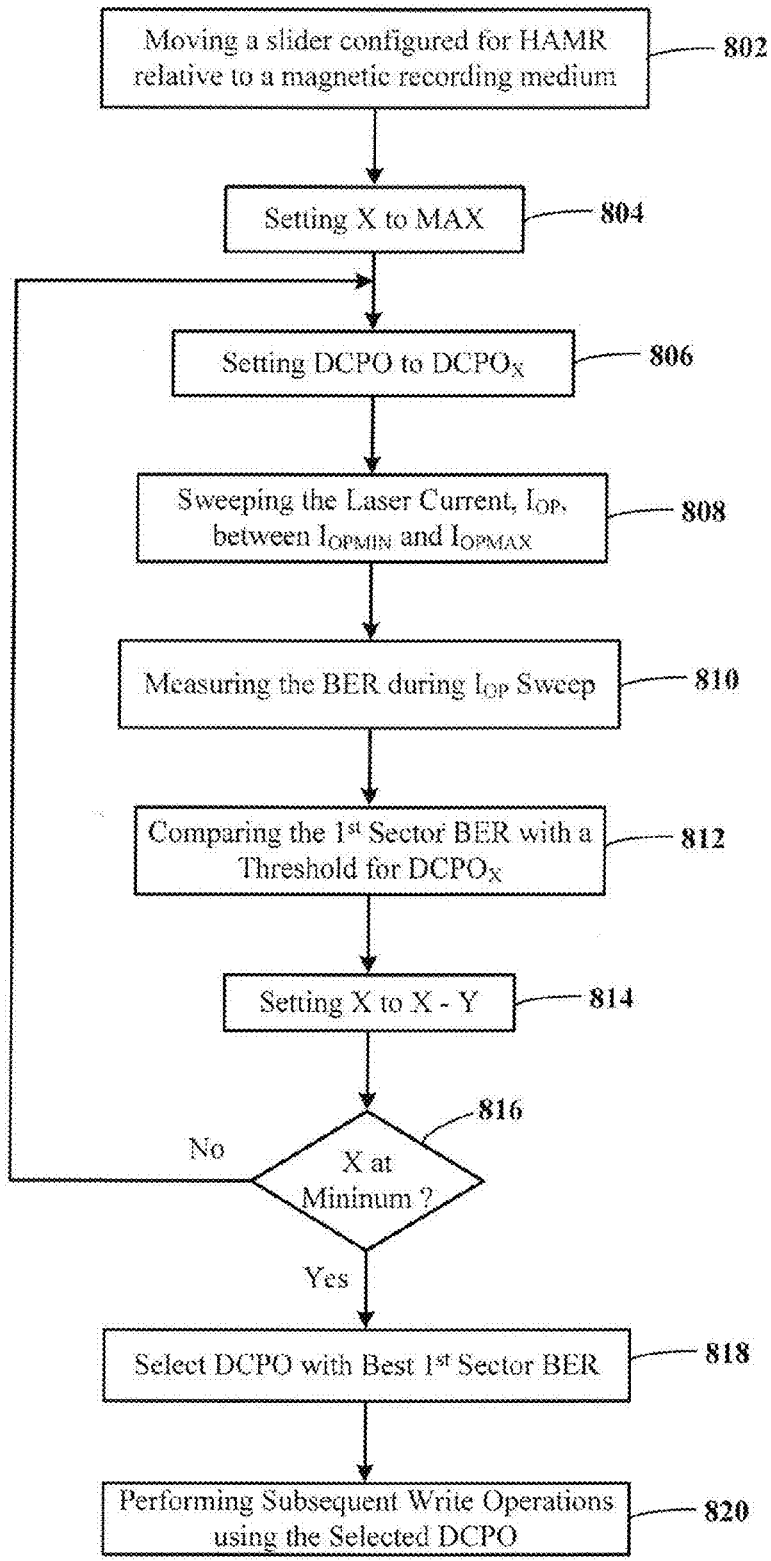
FIG. 8 illustrates a method for calibrating the target pre-write clearance offset of a HAMR head in accordance with various embodiments.

FIG. 8 illustrates a method for calibrating the target pre-write clearance offset of a HAMR slider in accordance with various embodiments. The method shown in FIG. 8 involves moving 802 a slider configured for HAMR relative to a magnetic recording medium. The method involves setting 804 a variable X to a value MAX (e.g., 60 Å). The method involves setting 806 the pre-write clearance offset, DCPO, to $DCPO_X$. During the first iteration of the method shown in FIG. 8, the pre-write clearance offset, DCPO, is set to $DCPO_{MAX}$ (e.g., a DCPO of 60 Å). $DCPO_{MAX}$ is preferably a pre-write clearance offset that is known to be higher than expected calibrated DCPO values for a particular HAMR slider design.

With DCPO set to $DCPO_X$, a write operation is performed which involves sweeping 808 the laser current, $I_{OP}$, between $I_{OPMIN}$ and $I_{OPMAX}$. $I_{OPMIN}$ and $I_{OPMAX}$ represent a range of $I_{OP}$ values that includes sub-optimal laser currents or optimal and sub-optimal laser currents. The method involves measuring 810 the BER (or other writability metric) during the $I_{OP}$ sweep. A comparison 812 is made between the first sector BER and a threshold for the current DCPO value ($DCPO_X$). The result of this comparison is stored. The variable X is then set to X−Y, where Y is a value less than X. The variable Y represents the amount (in Angstroms) by which the value of DCPO is reduced for the next iteration of the method shown in FIG. 8. For example, $DCPO_X$ can be set to 60 Å in block 806, and the variable Y can be set to 10 Å. In this example, the value of X in block 814 is reduced from 60 Å to 50 Å.

A check is made 816 to determine if X has reached a minimum. For example, the minimum can be 0 or a number greater than 0. If X has not reached the minimum, the current value of DCPO ($DCPO_X$) is reduced by the value of variable Y ($DCPO_{X-Y}$) at block 806 (e.g., DCPO is adjusted from 60 Å to 50 Å). It is noted that the variable Y need not be an integer or a constant. For example, the value of DCPO can be reduced by the variable Y whose magnitude can vary between iterations of blocks 806-816. With DCPO reduced to its new value at block 806, the processes of blocks 808 and 816 are repeated for the new value of DCPO and subsequently adjusted values of DCPO. Table 1 below shows representative values for target pre-write clearance, target write clearance, and DCPO which can be operative in the method shown in FIG. 8.

TABLE 1

| Target Pre-Write Clearance (Å) | Target Write Clearance (Å) | DCPO (Å) |
|---|---|---|
| 120 | 60 | 60 |
| 110 | 60 | 50 |
| 100 | 60 | 40 |
| 90 | 60 | 30 |
| 80 | 60 | 20 |
| 70 | 60 | 10 |
| 60 | 60 | 0 |

If X has reached the minimum, as tested in block 816, the DCPO that produces the first sector BER closest to the threshold is selected 818. The method can further involve performing 820 subsequent write operations using the selected DCPO.

Various types of comparisons can be made in order to select the DPCO that produces the best writability metric for a particular slider. According to some embodiments, for each DPCO, the first sector BER or average BER for the first few sectors (e.g., between 5 and 20 sectors) can be compared with the last sector BER for data written to a track. In this embodiment, the last sector BER represents the threshold against which the first sector BER or average BER for the first few sectors is compared. The first and last sectors of a data track are assumed to have the same media variability since they are physically near each other on the disk, and the clearance of the last sector relative to the first sector can produce the previously described issue of poor write performance that can occur for the first few sectors of a track. According to other embodiments, for each DPCO, an average BER for the data track can be calculated. A comparison can be made between the first sector BER or average BER for the first few sectors (e.g., between 5 and 20 sectors) and the track average BER. In this embodiment, the track average BER represents the threshold against which the first sector BER or average BER for the first few sectors is compared. Writability metrics other than BER can be used, such as head-medium spacing (HMS) via a contact sensor of the slider, reader VGA (variable gain amplifier) measurements, Servo VGA measurements, etc.

According to some embodiments, a curve of BER as a function of different laser currents ($I_{OP}$) can be generated and compared (e.g., a slope comparison) to a threshold curve for each of a number of different DPCO values. For example, a threshold curve can be a curve of the track average BER as a function of different laser currents ($I_{OP}$)

for each of a number of different DPCO values, examples of which are shown in FIGS. 9-12. By way of further example, a threshold curve can be a curve of last sector BER as a function of different laser currents ($I_{OP}$) for each of a number of different DPCO values.

Figure 9:
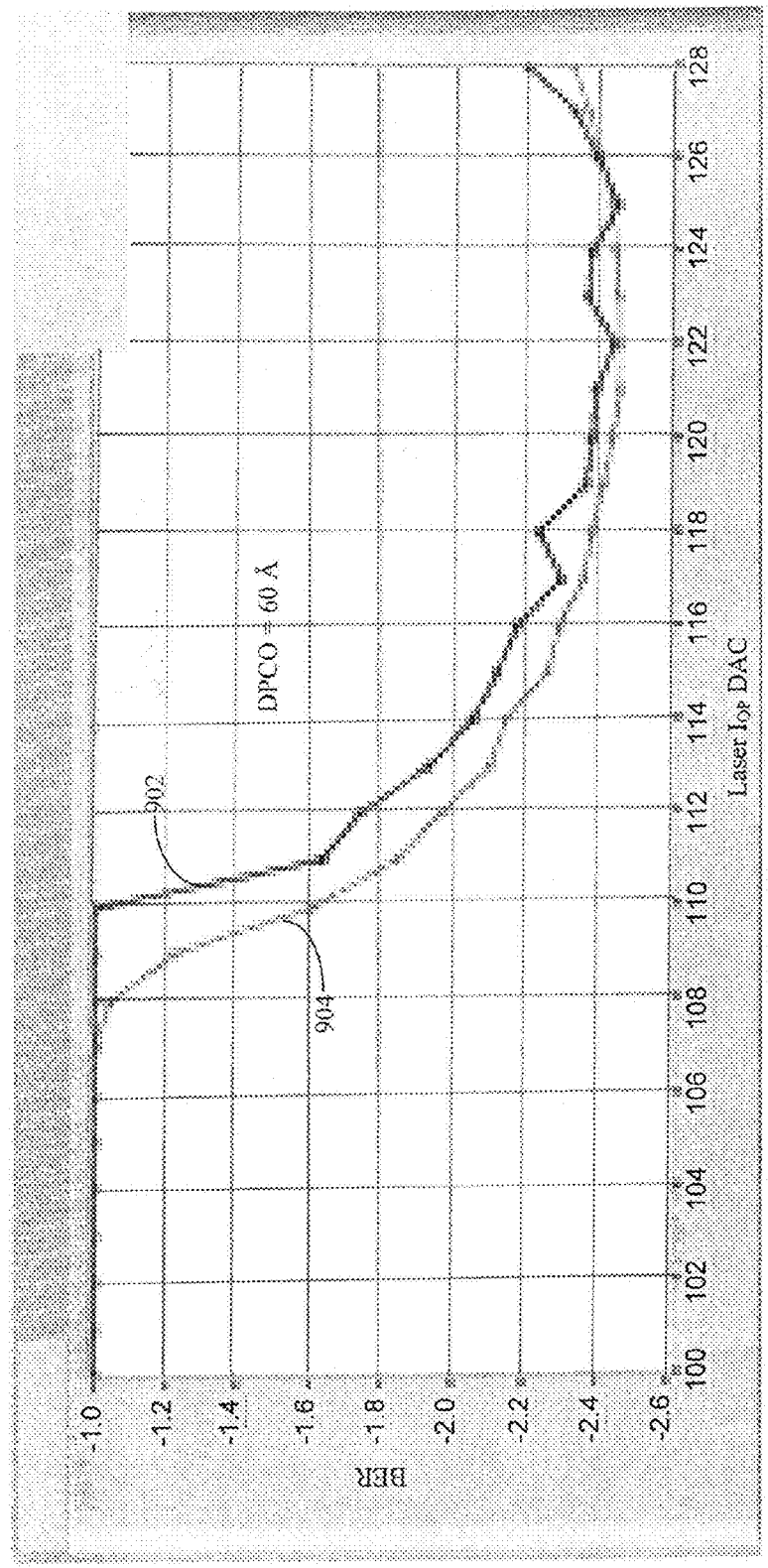
FIG. 9 shows the first sector BER in relation to the track average BER as a function of laser current ($I_{OP}$) at a first target pre-write clearance offset in accordance with various embodiments.
Figure 10:
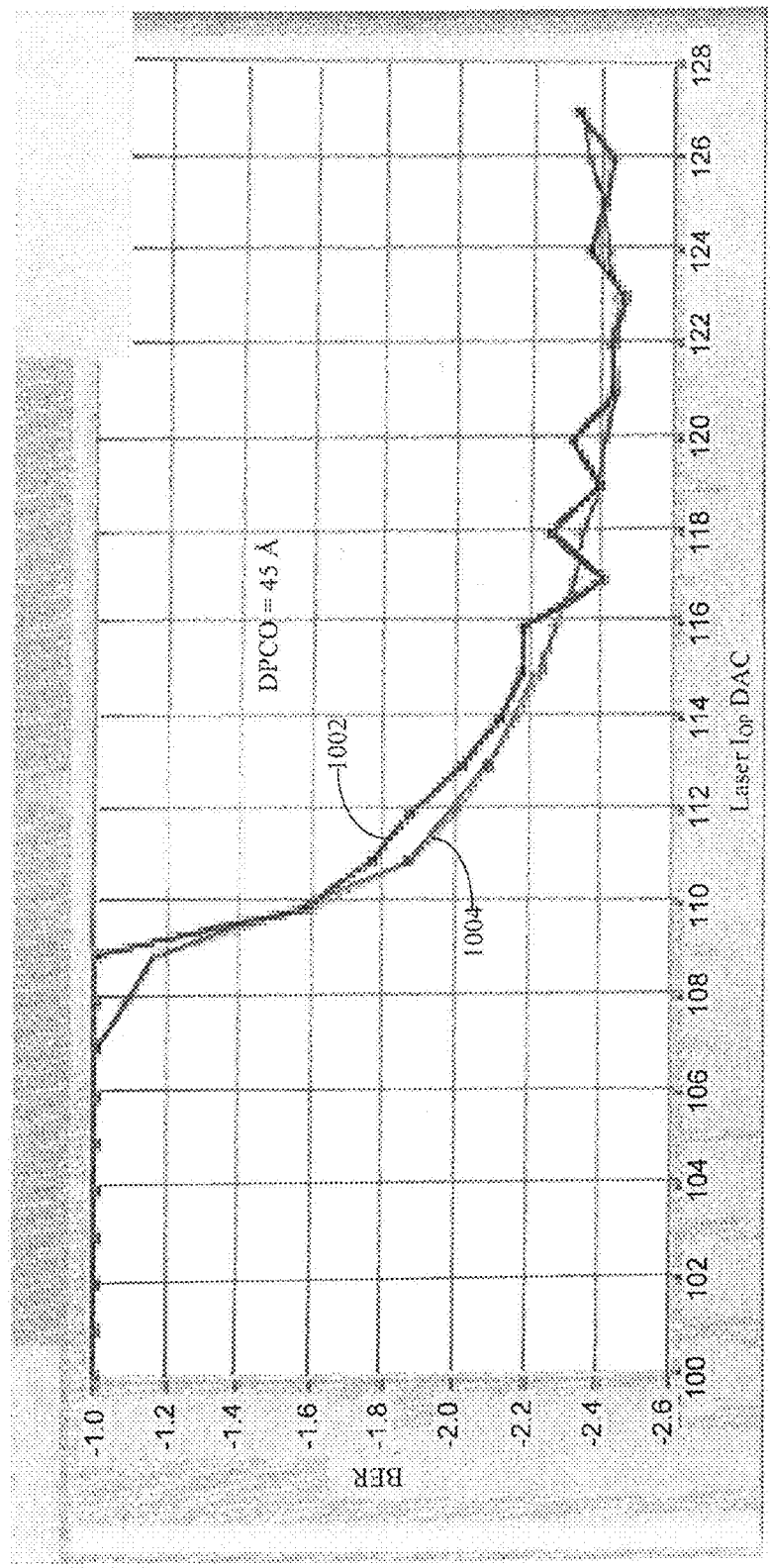
FIG. 10 shows the first sector BER in relation to the track average BER as a function of laser current ($I_{OP}$) at a second target pre-write clearance offset in accordance with various embodiments.
Figure 11:
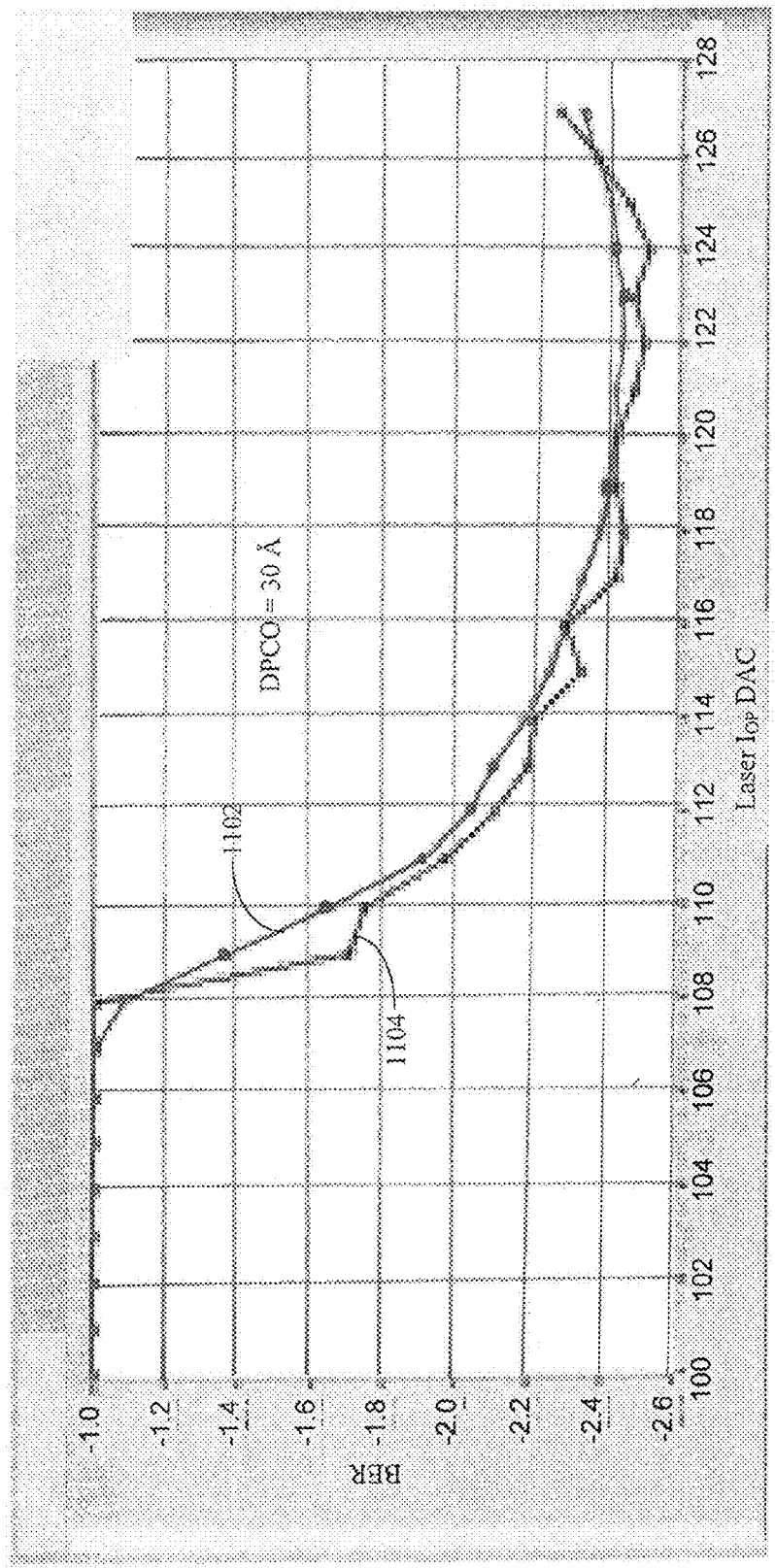
FIG. 11 shows the first sector BER in relation to the track average BER as a function of laser current ($I_{OP}$) at a third target pre-write clearance offset in accordance with various embodiments.
Figure 12:
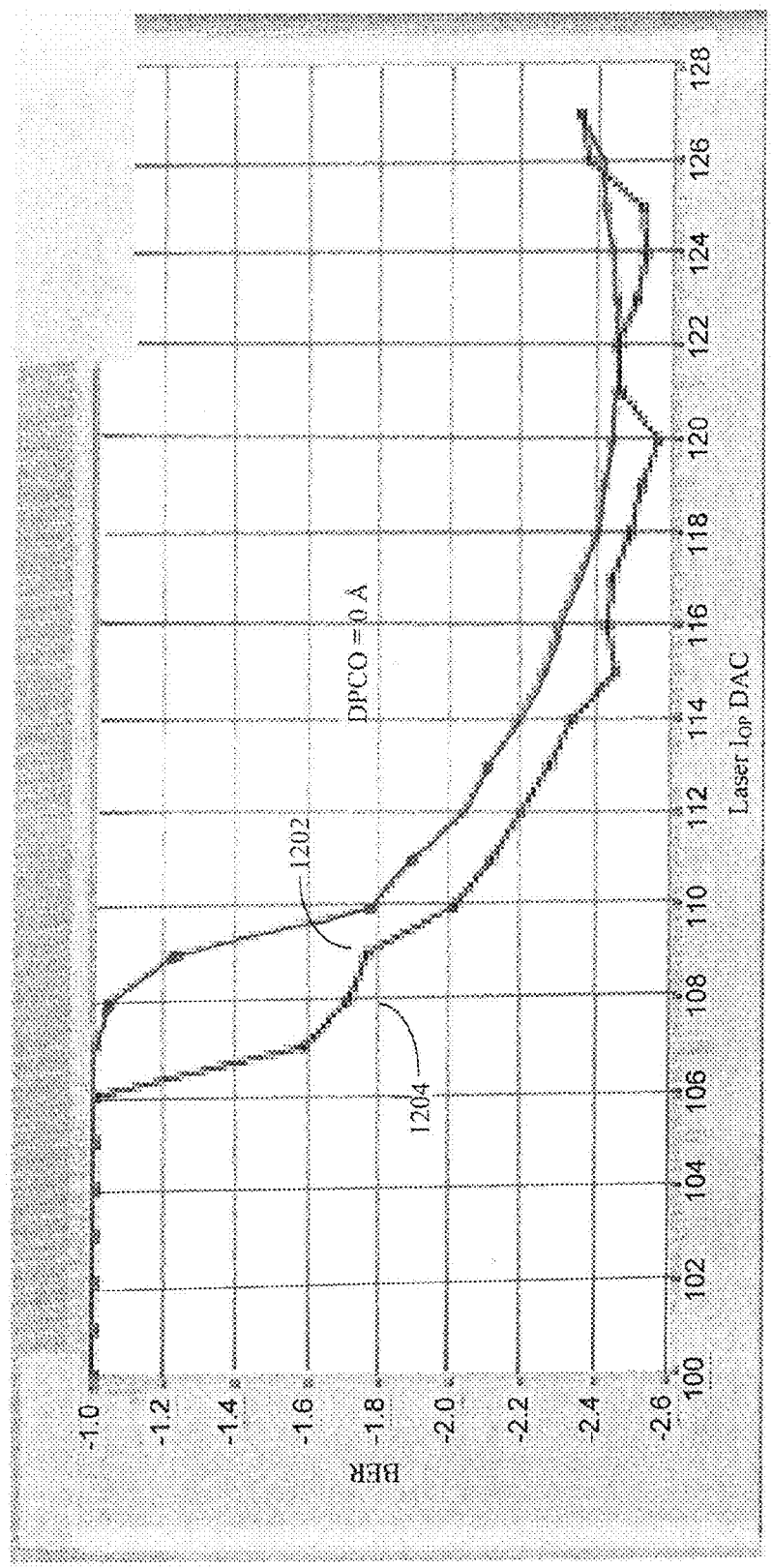
FIG. 12 shows the first sector BER in relation to the track average BER as a function of laser current ($I_{OP}$) at a fourth target pre-write clearance offset in accordance with various embodiments.

FIGS. 9-12 show the first sector BER in relation to the track average BER as a function of laser current ($I_{OP}$) at varying DPCO values in accordance with various embodiments. The laser current, $I_{OP}$, was varied across a current range that includes sub-optimal or optimal and sub-optimal values of $I_{OP}$. In FIG. 9, DPCO was set at 60 Å. At a DPCO of 60 Å, the first sector BER curve 902 is spaced away from the track average BER curve 904. In FIG. 10, DPCO was set at 45 Å. At a DPCO of 45 Å, the first sector BER curve 1002 tracks fairly closely to the track average BER curve 1004. In FIG. 11, DPCO was set at 30 Å. At a DPCO of 30 Å, the first sector BER curve 1102 is spaced somewhat closely to the track average BER curve 1104, but less closely than in FIG. 10. In FIG. 12, DPCO was set at 0 Å. At a DPCO of 0 Å, the 1$^{st}$ sector BER curve 1202 is spaced away from the track average BER curve 1204. It can be seen in FIGS. 9-12 that the best first sector BER curves are those shown in FIGS. 10 and 11, which correspond to a DPCO of 45 and 30 Å, respectively. If the goal is minimizing the difference between the first sector BER and the track average BER, then setting the DPCO at about 37 Å would be ideal for this HAMR slider.

It is been found that setting DPCO below a certain value can become a slider reliability concern. For example, setting DPCO below 20 Å can result in excellent writability performance but cause the slider to fly too low to the recording medium, raising concerns of slider reliability (e.g., excessive contact with the medium). According to various embodiments, a method of calibrating the target pre-write clearance offset of a HAMR slider can involve increasing the target write clearance component while decreasing the target pre-write clearance component of DCPO when DCPO falls below a predetermined threshold (e.g., 20 Å). Table 2 below shows representative values for target pre-write clearance, target write clearance, and DCPO which can be operative in an alternative target pre-write clearance offset calibration method in accordance with various embodiments.

TABLE 2

| Target Pre-Write Clearance (Å) | Target Write Clearance (Å) | DCPO (Å) |
| --- | --- | --- |
| 100 | 60 | 40 |
| 90 | 60 | 30 |
| 80 | 60 | 20 |
| 78 | 62 | 16 |
| 76 | 64 | 12 |
| 74 | 66 | 8 |

As is shown in Table 2 above, the write clearance is maintained at 60 Å while the target pre-write clearance is reduced from 100 Å in increments of 10 Å as DCPO is decreased from 40 Å in 10 Å increments. Decrementing the target pre-write clearance by 10 Å while maintaining the target write clearance at 60 Å for each 10 Å decrease in DCPO continues until a DCPO threshold of 20 Å is reached. Upon reaching the DCPO threshold, the target pre-write clearance is decremented while the target write clearance is incremented. In this representative example, DCPO is reduced from 20 to 16 Å, the target pre-write clearance is reduced from 80 to 78 Å, and the target write clearance is increased from 60 to 62 Å. This process of decreasing the target pre-write clearance while increasing the target write clearance continues for each subsequent decrement of DCPO below the threshold of 20 Å. As such, the DCPO below the DCPO threshold is split between a decrease in the target pre-write clearance and an increase in the target write clearance.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor or controller. Such instructions may be stored on a non-transitory computer-readable medium and transferred to the processor for execution as is known in the art.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method, comprising:
   moving a slider configured for heat-assisted magnetic recording relative to a magnetic recording medium;
   setting the slider to a target pre-write clearance prior to performing a write operation;
   setting a target write clearance of the slider for performing the write operation;
   determining a difference between the target pre-write and write clearances to define a target pre-write clearance offset;
   measuring, while sweeping a laser diode current for each of a plurality of different target pre-write clearance offsets, a writability metric for the slider;
   adjusting the target pre-write clearance offset so that the writability metric reaches a predetermined threshold; and
   performing subsequent write operations using the adjusted target pre-write clearance offset.

2. The method of claim 1, wherein:
   the method is performed for at least a first sector or first few sectors and a last sector of a track of the medium; and
   the target pre-write clearance offset is adjusted so that the writability metric of the first sector or first few sectors is about the same as that of the last sector.

3. The method of claim 1, wherein:
   the method is performed for all sectors of a track of the medium; and
   the target pre-write clearance offset is adjusted so that the writability metric of the first sector or first few sectors is about the same as an average writability metric for all of the sectors.

4. The method of claim 1, wherein:
   the readability metric comprises a bit error rate (BER); and
   the predetermined threshold is a last sector BER or a track average BER.

5. The method of claim 1, wherein:
   the target pre-write clearance is greater than the target write clearance; and
   adjusting the target pre-write clearance offset comprises reducing the target pre-write clearance.

6. The method of claim 1, wherein:
the target pre-write clearance is greater than the target write clearance; and
adjusting the target pre-write clearance offset comprises reducing the target pre-write clearance and the target write clearance in response to the adjusted target pre-write clearance offset falling below a pre-established threshold.

7. The method of claim 1, wherein setting the target pre-write clearance is based on target pre-write clearances of a population of sliders.

8. The method of claim 1, wherein adjusting the target pre-write clearance offset compensates for local laser induced writer protrusion (LLIWP) that reduces the writability metric for initial sectors of a track of the medium.

9. The method of claim 1, wherein the method is performed for each of a plurality of the sliders of a heat-assisted magnetic recording device.

10. The method of claim 1, wherein the adjusted target pre-write clearance offset falls within a range of about 5 to 60 Å.

11. An apparatus, comprising:
a slider movable relative to a magnetic recording medium, the slider comprising a writer, a heater, a near-field transducer, and an optical waveguide for communicating light from a laser diode to the near-field transducer; and
a controller coupled to the slider and configured to:
set a target pre-write clearance of the slider prior to performing a write operation;
set a target write clearance of the slider for performing the write operation;
determine a difference between the target pre-write and write clearances to define a target pre-write clearance offset;
measure, for a plurality of different target pre-write clearance offsets, a writability metric for the slider while sweeping a laser diode current;
adjust the target pre-write clearance offset so that the writability metric reaches a predetermined threshold; and
perform subsequent write operations using the adjusted target pre-write clearance offset.

12. The apparatus of claim 11, wherein the controller is configured to adjust the target pre-write clearance offset so that the writability metric of a first sector or first few sectors of a track of the medium is about the same as that of a last sector of the track.

13. The apparatus of claim 11, wherein the controller is configured to adjust the target pre-write clearance offset so that the writability metric of a first sector or first few sectors of a track of the medium is about the same as an average writability metric for all of the sectors of the track.

14. The apparatus of claim 11, wherein:
the readability metric comprises a bit error rate (BER); and
the predetermined threshold is a last sector BER or a track average BER.

15. The apparatus of claim 11, wherein:
the target pre-write clearance is greater than the target write clearance; and
the controller is configured to adjust the target pre-write clearance offset by reducing the target pre-write clearance.

16. The apparatus of claim 11, wherein:
the target pre-write clearance is greater than the target write clearance; and
the controller is configured to adjust the target pre-write clearance offset by reducing the target pre-write clearance and the target write clearance in response to the adjusted target pre-write clearance offset falling below a pre-established threshold.

17. The apparatus of claim 11, wherein the controller is configured to set the target pre-write clearance based on target pre-write clearances of a population of sliders.

18. The apparatus of claim 11, wherein the controller is configured to adjust the target pre-write clearance offset to compensate for local laser induced writer protrusion (LLIWP) that reduces the writability metric for initial sectors of a track of the medium.

19. The apparatus of claim 11, wherein the apparatus comprises a plurality of sliders for which the target pre-write clearance offsets are adjusted.

20. The apparatus of claim 11, wherein the adjusted target pre-write clearance offset falls within a range of about 5 to 60 Å.

* * * * *